(12) United States Patent
Saund et al.

(10) Patent No.: US 9,280,503 B2
(45) Date of Patent: Mar. 8, 2016

(54) ROUND ROBIN ARBITER HANDLING SLOW TRANSACTION SOURCES AND PREVENTING BLOCK

(71) Applicant: Apple Inc., Cupertino, CA (US)

(72) Inventors: Gurjeet S. Saund, Saratoga, CA (US); Deniz Balkan, Santa Clara, CA (US); Munetoshi Fukami, Newark, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 13/861,696

(22) Filed: Apr. 12, 2013

(65) Prior Publication Data

US 2014/0310437 A1 Oct. 16, 2014

(51) Int. Cl.
*G06F 13/37* (2006.01)
*G06F 13/36* (2006.01)

(52) U.S. Cl.
CPC ............. *G06F 13/37* (2013.01); *G06F 13/36* (2013.01)

(58) Field of Classification Search
USPC ......... 710/107, 111, 113, 116, 309, 310, 240, 710/241, 244; 370/235
See application file for complete search history.

(56) References Cited

U.S. PATENT DOCUMENTS

| | | | |
|---|---|---|---|
| 4,969,120 A | 11/1990 | Azevedo et al. | |
| 5,528,766 A * | 6/1996 | Ziegler et al. | 710/113 |
| 5,564,062 A | 10/1996 | Meaney et al. | |
| 5,784,564 A | 7/1998 | Camaisa et al. | |
| 6,330,223 B1 * | 12/2001 | Shimonishi | 370/230 |
| 6,556,572 B1 * | 4/2003 | Ishida | 370/395.41 |
| 7,203,202 B2 | 4/2007 | Chao et al. | |
| 2003/0103514 A1 * | 6/2003 | Nam et al. | 370/412 |
| 2005/0141424 A1 * | 6/2005 | Lim et al. | 370/235 |
| 2005/0172063 A1 * | 8/2005 | Hofmann et al. | 710/306 |
| 2007/0067528 A1 * | 3/2007 | Schaffer et al. | 710/116 |
| 2009/0183164 A1 * | 7/2009 | Carlstrom | 718/103 |
| 2011/0179248 A1 * | 7/2011 | Lee | 711/171 |
| 2014/0317323 A1 * | 10/2014 | Dodge et al. | 710/119 |

* cited by examiner

*Primary Examiner* — Khanh Dang
(74) *Attorney, Agent, or Firm* — Meyertons, Hood, Kivlin, Kowert & Goetzel, P.C.; Lawrence J. Merkel (57) ABSTRACT

In an embodiment, an arbiter may implement a deficit-weighted round-robin scheme having a delayed weight-reload mechanism. The delay may be greater than or equal to a ratio of the fabric clock to a slower clock associated with one or more sources that have no transactions but that have unconsumed weights (or another measure of difference in transaction rate). If a transaction is provided from the one or more sources during the delay, the reload of the weights may be prevented. In some embodiments, the arbiter may be augmented to improve usage of the bandwidth on an interface in which some transactions may be limited for a period of time. The arbiter may implement a first pointer that performs round robin arbitration. If the first pointer is indicating a source whose transaction is temporarily blocked, a second pointer may search forward from the current position of the main pointer to locate a non-blocked transaction.

18 Claims, 7 Drawing Sheets

| CMD | W0 | R0 | R1 | R2 | W1 | | | |
|---|---|---|---|---|---|---|---|---|
| Data | | W00 | W01 | W02 | W03 | W10 | W11 | W12 | W13 |

ROUND ROBIN ARBITER HANDLING SLOW TRANSACTION SOURCES AND PREVENTING BLOCK

BACKGROUND

1. Field of the Invention

This invention is related to the field of communication fabric arbiters.

2. Description of the Related Art

Digital systems of various types generally include a variety of components connected together via a communication fabric. The communication fabric can include buses, point-to-point links, hierarchical interconnects, full or partial crossbars, etc. At various points within the fabric, transactions from different sources can share part of the fabric. Generally, an arbiter is employed to select among the transactions when there is a conflict. For example, a conflict can occur when transactions arrive at the shared point contemporaneously. A conflict can occur when sources connected to a shared point (e.g. a shared bus) concurrently have transactions to initiate. Various arbitration schemes exist to perform the transaction selection, typically attempting to be fair over time to each source, to prevent starvation of each source, and to provide high performance and high utilization of the bandwidth on the fabric.

One type of arbitration scheme is a "round robin" scheme. In the round robin scheme, the sources are logically ordered in a ring. The order of sources in the ring is referred to as the round robin order, and does not necessarily correlate to the physical locations of the sources. The arbiter maintains a pointer to one of the sources, and that source is the highest priority source for transactions for the current arbitration. The arbiter can select a transaction from the source that is identified as highest priority, and can advance the pointer to the next source in the round robin order. The pure round robin scheme provides equal opportunity to each source over time, but may not always match up to when the source has a transaction to send. Additionally, providing equal opportunity to all sources may not be the best overall scheme for performance. For example, the sources can have different bandwidth requirements, and thus better overall performance can be achieved by providing more bandwidth to some sources than others.

A mechanism for allocating bandwidth unequally in the round robin scheme is the deficit-weighted round robin scheme. In the deficit-weighted scheme, a weight is assigned to each source that is proportional to the amount of bandwidth that is assigned to that source. Each time a transaction from the source wins arbitration, its weight is updated. Once its weight is consumed, the source is skipped in the round robin arbitration. Once the weights for all sources are exhausted, the weights can be reloaded. In some cases, the weights are also reloaded if all the sources that have transactions to transmit have exhausted their weights, even if a source that has no transactions has not exhausted its weight. However, such a scheme may create issues for sources that are operating more slowly than the fabric itself. Such sources can only transmit a transaction to the arbiter once per clock cycle of their slower clock. Accordingly, at the higher clock frequencies, it can appear that the slower source does not have a transaction to send when it actually does have one. The weights can thus be falsely reloaded, which can result in different bandwidth characteristics than those expected from the configuration of the weights.

SUMMARY

In an embodiment, an arbiter may implement a deficit-weighted round-robin scheme. However, the arbiter may implement a delayed weight-reload mechanism if the weights are being reloaded due to a lack of transactions from one or more sources that have unconsumed weights. The delay may avoid falsely reloading the weights when the source is operating more slowly than other sources and/or the fabric itself. For example, the source may be operating at a lower clock frequency. The source may be using a narrower interconnect than other sources, or protocol limitations may prevent the source from transmitting transactions as frequently as other sources. In one embodiment, the delay may be greater than or equal to a ratio of the fabric clock to the lower clock. If a transaction arrives from the one or more sources during the delay, the reload of the weights may be prevented and the distribution of bandwidth indicated by the weights may be more accurately adhered to. Other embodiments may implement any other deficit-weighted arbitration scheme (e.g. least recently granted (LRG)).

Viewed in another way, in some embodiments, the source may be operating more slowly than the fabric on which the arbiter is granting transactions (and more slowly than the arbiter itself). The source may have consecutive ("back-to-back") transactions to transmit, but the transactions may only be transmitted at the source's speed. On the faster fabric, there may be clock cycles in which the source does not appear to be transmitting a transaction. The delay mechanism may effectively "stretch" the transaction over these clock cycles. For example, the validity of the transaction may be extended over these clock cycles, in an embodiment.

In some embodiments, the arbiter may be augmented to improve usage of the bandwidth on an interface in which some transactions may be limited for a period of time. For example, in an embodiment, once a write transaction is initiated on a fabric link, another write transaction may not be initiated until the data for the write transaction has been transmitted. The arbiter may implement a first pointer (main pointer) that performs round robin arbitration. If the main pointer is indicating a source whose transaction is temporarily blocked, a second pointer (sub pointer) may search forward from the current position of the main pointer to locate a non-blocked transaction. The sub pointer may be updated to point to the next source after the granted source (that has the non-blocked transaction) in the round robin order. In this manner, transactions may be more frequently selected to fill the available bandwidth.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
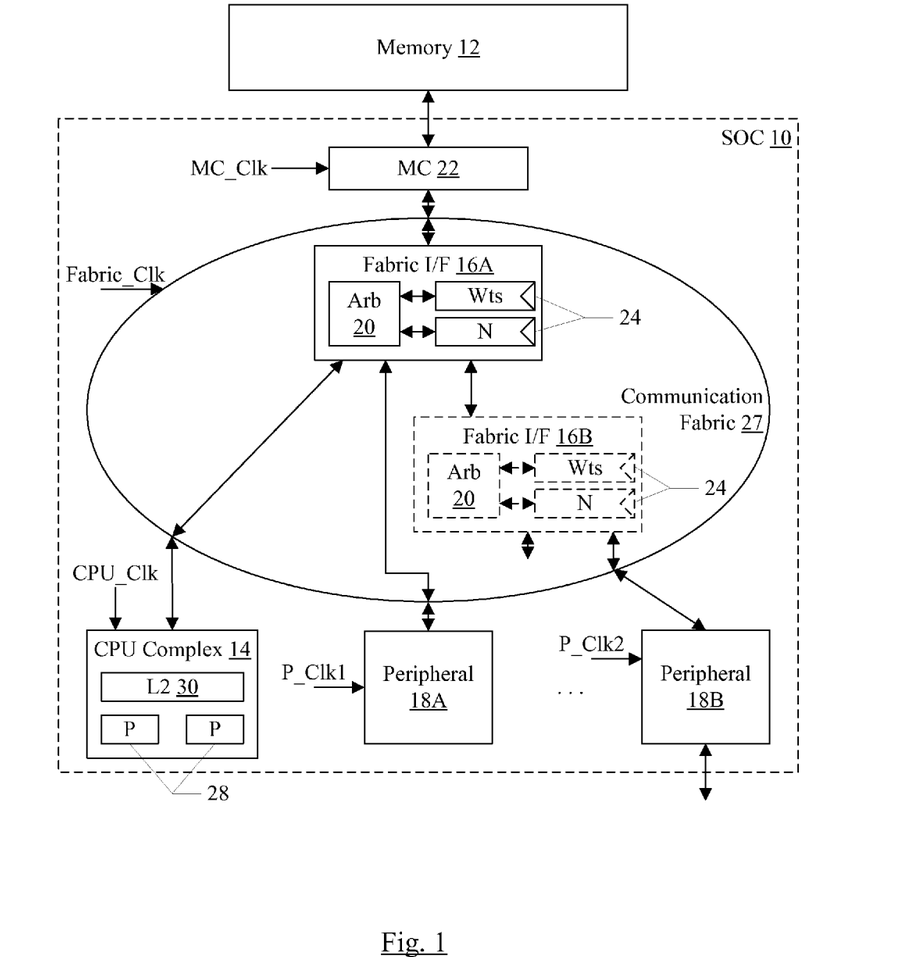
FIG. 1 is a block diagram of one embodiment of a system on a chip (SOC) coupled to a memory.

Turning now to FIG. 1, a block diagram of one embodiment of an SOC 10 is shown coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, peripheral components 18A-18B (more briefly, "peripherals"), a memory controller 22, and a communication fabric 27. The components 14, 18A-18B, and 22 may all be coupled to the communication fabric 27. Each component 14, 18A-18B, and 22 and the communication fabric 27 may also have an associated clock or clocks, represented as a clock input in FIG. 1: CPU_Clk for the CPU complex 14, P_Clk1 for the peripheral 18A, P_Clk2 for the peripheral 18B, Fabric_Clk for the communication fabric 27, and MC_Clk for the memory controller 22. The memory controller 22 may be coupled to the memory 12 during use. In the illustrated embodiment, the CPU complex 14 includes one or more processors 28 and a level two (L2) cache 30.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

As illustrated in FIG. 1, the communication fabric 27 may include one or more fabric interface circuits such as fabric interface circuit 16A and optionally fabric interface circuit 16B. If more than one fabric interface circuit 16A-16B is included, the fabric interface circuits may be coupled in hierarchical fashion (e.g. as shown in FIG. 1), in parallel, or a combination thereof. In general, there may be a fabric interface circuit 16A-16B at each point in the communication fabric 27 were transactions sourced by different transaction sources may share a portion of the interconnect. For example, in FIG. 1, the fabric interface circuit 16A may be coupled to receive transactions from the CPU complex 14, the peripheral 18A, and the output of the fabric interface circuit 16B. The fabric interface circuit 16B may be coupled to receive transactions from the peripheral 18B and at least one other component, not shown in FIG. 1. In other embodiments, the peripherals 18A-18B may be coupled to the fabric interface circuit 16B, the output of which may be coupled to the fabric interface circuit 16A. The output of the fabric interface circuit 16A may be coupled to the memory controller 22. Thus, the communication fabric 27 may be configured to communicate memory transactions to the memory controller 22 (and responses from the memory controller 22). In some embodiments, the communication fabric 27 may also support communication directly between components.

Each fabric interface circuit 16A-16B may include an arbiter circuit 20 (more briefly "arbiter") and a set of one or more configuration registers 24. The arbiter 20 may be configured to select transactions for transmission from among the received transactions. The transactions may be sorted for arbitration purposes according to the source and/or according to priority, quality of service (QoS) information associated with each transaction, or virtual channel associated with the transaction. The fabric interface circuit 16A-16B may also include buffers, such as first-in, first-out buffers (FIFO) (not shown in FIG. 1), to capture received transactions until they win arbitration and are transmitted out of the fabric interface circuit 16A-16B.

In the illustrated embodiment, the arbiters 20 may implement a deficit-weighted round robin arbitration scheme and thus may be programmable in the configuration registers 24 with weights for each input port and/or transaction priority/QoS level/virtual channel. Additionally, the configuration registers 24 may be programmable with a delay factor "N", as discussed in more detail below. The delay factor may be a measure of delay in reloading the deficit weights if a transaction source is not transmitting a transaction, its deficit weight has not been consumed, and other deficit weights have been consumed. In an embodiment, the delay factor may be an integer number of clock cycles of the clock for the communication fabric (Fabric_Clk in FIG. 1). The delay factor may be measured in any desired units in other embodiments. The arbiters 20 may also implement other deficit-weighted schemes such as a least recently granted (LRG) scheme in which the source/priority/QoS level/virtual channel having a transaction to send and having available weight is granted, in an embodiment. Any deficit weighted scheme may be used.

The fabric interface circuits 16A-16B may be clocked by the Fabric_Clk supplied to the communication fabric 27. More particularly, the arbiter in each fabric interface circuit 16A-16B may be clocked by the Fabric_Clk and transmissions on the interconnect within the communication fabric 27 may be clocked by the Fabric_Clk. Similarly, the CPU complex 14 may be clocked by the CPU_Clk, the peripheral 18A may be clocked by the P_Clk1, the peripheral 18B may be clocked by the P_Clk2 clock, and the memory controller 22 may be clocked by the MC_Clk. The clocks may be at least partially independent, and may be programmed at different frequencies. Particularly, one or more of the component clocks CPU_Clk, P_Clk1, P_Clk2, etc. may be programmed to a lower frequency than the Fabric_Clk. Since the component may transmit at most one transaction per clock cycle of its component clock, in cases in which the component clock is at a lower frequency than the Fabric_Clk, there may be cases in which it appears to the arbiter 20 that the component is not transmitting a transaction when that component does indeed have a steady flow of transactions at the component clock rate. In other embodiments, other factors than clock frequency differences may affect the maximum transaction rate from a given component. For example, differences in width of the interconnect between a given component and the fabric interface circuit 16A-16B, protocol differences, etc. may affect the maximum transfer rate of the given component. Accordingly, a transaction source may be viewed as operating more slowly than another source if transaction rates are limited for any reason.

The arbiter 20 may be configured to delay a reload of deficit weights for a period of the delay factor after detecting a lack of transaction from a component (i.e. a transaction source) if that component has unconsumed deficit weight and other components have consumed their respective deficit weights. If a transaction is received during the delay period, then the reload may be cancelled. If the delay period expires without a transaction being received, the reload may be performed. False reloads due to lower frequency operation or other reduction of maximum transfer rate may thus be avoided.

A transaction source may generally be any circuitry that is configured to originate a transaction on the communication fabric 27. In the embodiment of FIG. 1, for example, the CPU complex 14 and the peripherals 18A-18B may be transaction sources for memory transactions to access the memory 12. Transaction sources may also be referred to as agents.

Generally, the deficit weights may be the weights initially assigned to each transaction source/priority/QoS level/virtual channel. The weights stored in the configuration registers 24 may be referred to by the arbiter 20, which may maintain dynamic state indicating the consumption of weights. For example, the dynamic state may be initialized to the weight and decremented to zero as the weight is consumed. Reaching zero in the dynamic state may indicate that all weight has been consumed (the weight is "exhausted"), and the source may be masked until the weights are reloaded. Alternatively, the dynamic state may be initialized to zero and incremented as the weight is consumed. The dynamic state may be compared to the weights in the registers 24 to detect exhaustion of the weight.

Reloading the weights may generally refer to providing additional weight to a given transaction source/priority/QoS level/virtual channel. The reload may restore the full amount of weight. Alternatively, the reload may add to the weight that is remaining, if any. Thus, if the dynamic state is decremented to reflect consumption, reloading the weights may refer to restoring the dynamic state to the weight values or adding the weights to the dynamic state. If the dynamic state is incremented to reflect consumption, reloading may refer to clearing the dynamic state or subtracting the weight from the dynamic state, in various embodiments. The weights may represent relative amounts of bandwidth to be assigned to different sources/priorities/QoS levels/virtual channels. For example, the weights may be transaction counts. Alternatively, the weights may be data counts and may be consumed based on the size of the transaction. Any representation may be used.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or and interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, image signal processors for image sensor data such as camera, scalers, rotators, blenders, graphics processing units, display controllers, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include various queues for buffering memory operations, data for the operations, etc., and the circuitry to sequence the operations and access the memory 12 according to the interface defined for the memory 12.

In some embodiments, the memory controller 22 may include a memory cache. The memory cache may store data that has been read from and/or written to the memory 12. The memory controller 22 may check the memory cache prior to initiating access to the memory 12. Power consumption on the memory interface to the memory 12 may be reduced to the extent that memory cache hits are detected (or to the extent that memory cache allocates are performed for write operations). Additionally, latency for accesses that are memory cache hits may be reduced as compared to accesses to the memory 12, in some embodiments.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

As mentioned above, a maximum transaction rate from various transaction sources may be limited as compared to the maximum transaction rates from other sources for a variety of reasons (clock frequency, interface width, protocol limitations, etc.). The delay factor "N" may be calculated based on a ratio of these transaction rates (or other measures that indicate the transaction rates, such as clock frequency or width). Clock frequency differences will be used as an example below, but the features described for the arbiter may be used for any reason that causes the maximum achievable transaction rate of one or more transaction sources to be lower than the maximum achievable transaction rate of other transaction sources.

Figure 2:
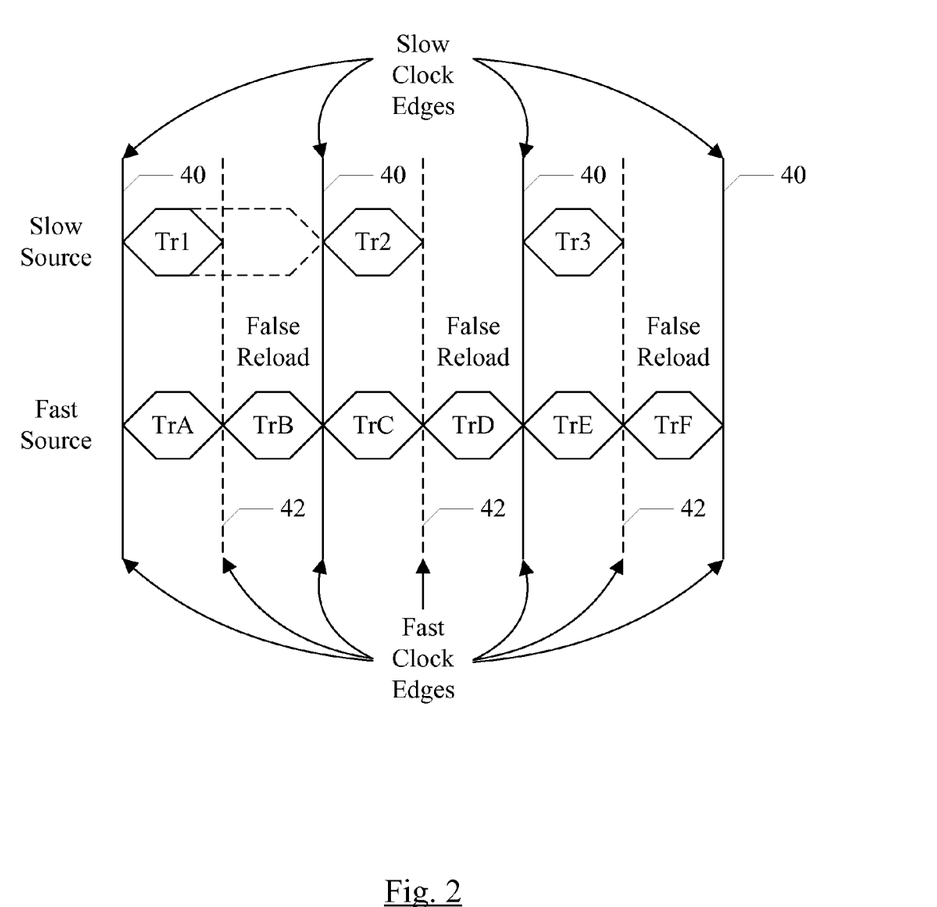
FIG. 2 is a timing diagram illustrating one embodiment of transactions from fast and slow requestors.

Turning now to FIG. 2, a timing diagram is shown illustrating transactions transmitted by a slow source operating at a slow clock frequency and transactions transmitted by another source operating at a fast clock frequency. In this illustration, the fast clock frequency is twice the slow clock frequency. However, there is no requirement that the clock frequencies be any particular multiple of each other. There is no requirement that the clock frequencies are in phase or capable of being in phase. Any two frequencies may be used.

In FIG. 2, the slow clock edges on which information is transferred are illustrated by the solid lines 40. The edges on which information is transferred may be, e.g., the rising edges. Alternatively, the edges on which information is transferred may be the falling edges, or both the rising and falling edges for double data rate transfer. The fast clock edges on which information is transferred are indicated by both the solid lines 40 and dashed lines 42.

In the example of FIG. 2, the slow source may have a steady stream of transactions to transmit (Tr1, Tr2, Tr3 ...) and the fast source may also have a steady stream of transactions to transmit (TrA, TrB, TrC ...). The slow source may transmit its transactions as quickly as possible (e.g. one per clock cycle of the slow clock). However, at the fast clock rate, it appears that every other cycle the slow source is not transmitting a transaction. If the fast source (and other sources, if any) has exhausted its weights, a false reload of the weights may be generated during the fast clock cycle in which there is no transaction from the slow source (labeled false reload in FIG. 2).

To prevent the false reloads, the arbiter may delay reload for a period of time sufficient to permit the slow source to transmit its next transaction, if it indeed has one to transmit. Effectively, the arbiter may extend the last transaction to cover the interval for the slow source, illustrated for the transaction Tr1 via dotted lines in FIG. 2. In an embodiment, the validity of the transaction Tr1 may be extended for an additional clock cycle in this example. The mechanism for implementing the delay may vary from embodiment to embodiment.

Figure 3:
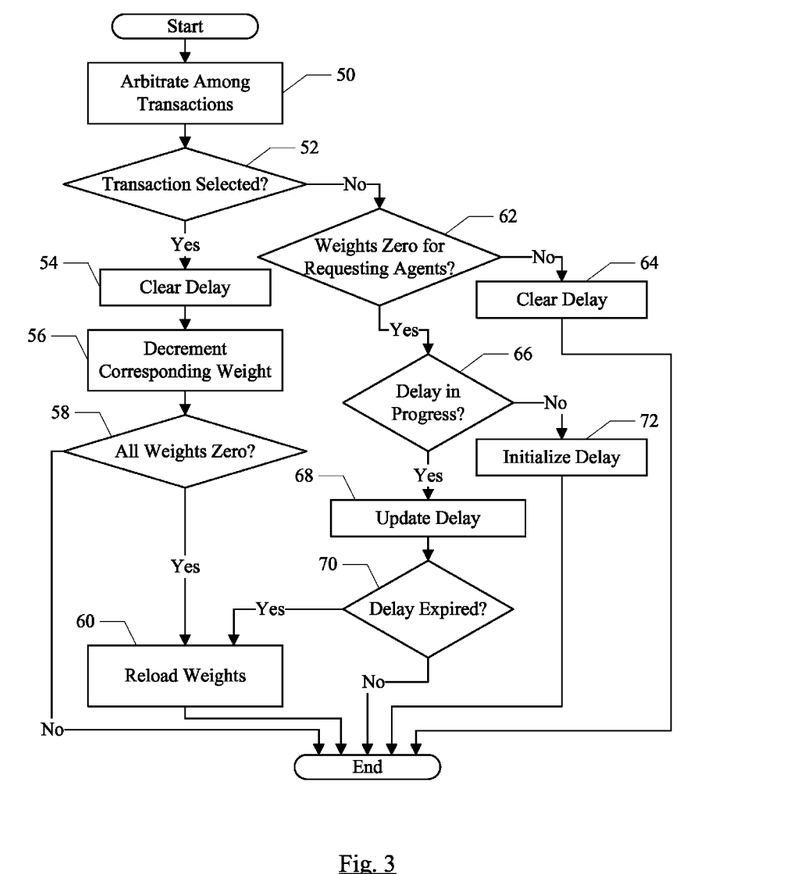
FIG. 3 is a flowchart illustrating operation of one embodiment of one or more arbiters shown in FIG. 1.

FIG. 3 is a flowchart illustrating operation of one embodiment of the arbiter 20 that may delay deficit weight reloads to avoid the false reload of weights. While the blocks are shown in a particular order, other orders may be used. Blocks may be performed in parallel in combinatorial logic within the arbiter 20. Blocks, combinations of blocks, and/or the flowchart as a whole may be pipelined over multiple clock cycles. The arbiter 20 may be configured to implement the operation shown in FIG. 3

The arbiter 20 may be configured to arbitrate among the transactions that are available (block 50). The arbitration scheme may be deficit-weighted round robin, in which a transaction may be skipped in the round robin order if its corresponding weight has been exhausted. Other embodiments may implement other deficit weighted schemes In this embodiment, a weight may be exhausted if it has been decremented to zero in the dynamic state. In some cases, the weight may be negative if the weight is measured in terms of transaction size rather than a transaction count. In such embodiments, the weight may be exhausted if it has been decremented to zero or less than zero.

If the arbitration results in the selection of a transaction (decision block 52, "yes" leg), then a transaction with a corresponding non-exhausted weight has been identified. The arbiter 20 may be configured to clear the delay in the dynamic state (block 54). In some embodiments, the delay may only be cleared if the transaction is from a slow transaction source. The arbiter 20 may be configured to decrement the weight corresponding to the transaction as well (block 56). If all the weights are exhausted (e.g. zero or less than zero) (decision block 58, "yes" leg), the arbiter 20 may be configured to reload the weights (block 60). In this case, there may be no delay to the reload since the weights have all been consumed.

If the arbitration does not result in the selection of a transaction (decision block 52, "no" leg) and the weight of at least one agent that has a transaction to send (a "requesting agent") is non-exhausted (decision block 62, "no" leg), the arbiter 20 may be configured to clear the delay in the dynamic state (block 64) because there is no reload to be performed. If each requesting agent has an exhausted weight (decision block 62, "yes" leg) and a delay of the reload is in progress (decision block 66, "yes" leg), the arbiter 20 may be configured to update the delay (e.g. incrementing the measured delay in the dynamic state, if the delay is measured in clock cycles of the Fabric_Clk—block 68). If the delay has expired (e.g. the measured delay is equal to the delay factor N in the configuration registers 24—decision block 70, "yes" leg), the arbiter 20 may be configured to reload the weights (block 60). If a delay is not in progress (decision block 66, "no" leg), the arbiter 20 may be configured to initialize the measured delay (e.g. at zero) to begin measuring the delay (block 72).

The above discussion refers to measuring the delay and comparing the delay to the delay factor N stored in the configuration registers 24. In an embodiment, the delay factor may be determined based on a ratio of the maximum transaction rate of a slow agent compared to the maximum transaction rate of a fast agent. The maximum transaction rate of the fast agent may also be the maximum transaction rate of the communication fabric 27. In an embodiment, the maximum transaction rate may be affected by one or more of the clock frequency of a clock corresponding to the agent, the width of interconnect for each agent, protocol differences between agents, etc.

Figure 4:
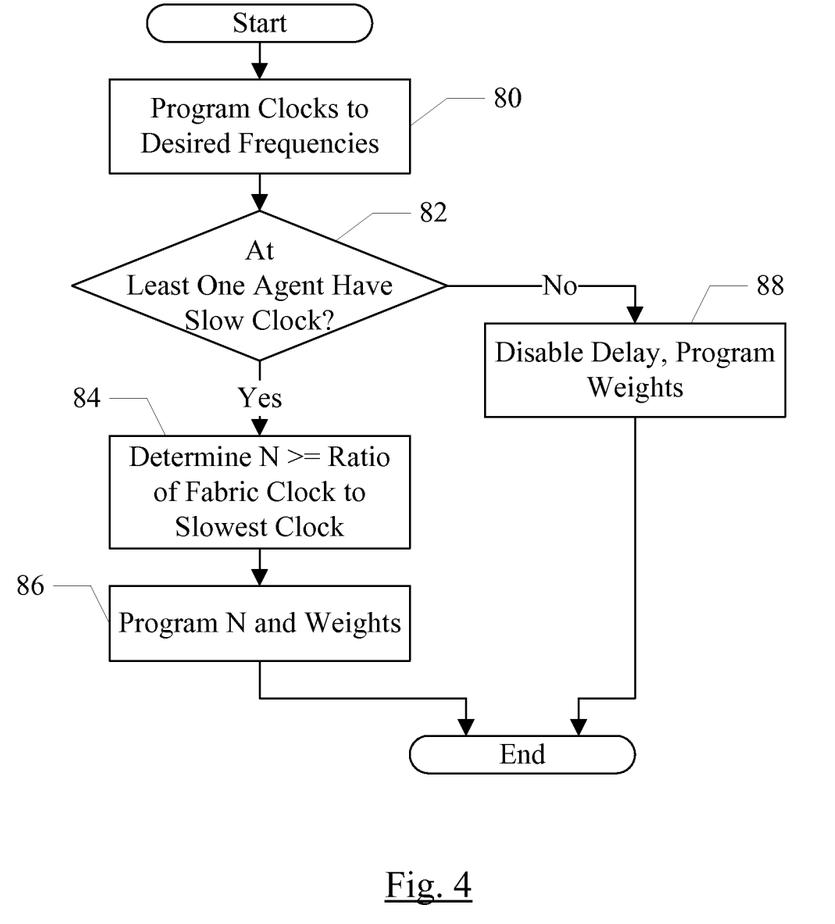
FIG. 4 is a flowchart illustrating one embodiment of programming the one or more arbiters shown in FIG. 1.

FIG. 4 is a flowchart illustrating configuration of an arbiter 20 in the case that differences in clock frequencies affect the maximum transfer rates. The operation of FIG. 4 may be performed in the SOC 10 during initialization (e.g. during boot, or when powering up the fabric 27 after a power down event for the fabric 27 in which the SOC 10 as a whole remains powered). The operation of FIG. 4 may also be performed at other times, e.g. when clock frequencies are being modified. The operation of FIG. 4 may be implemented in program instructions executable by the CPUs 28 (and stored in a computer accessible storage medium within the system or coupled to the system), in hardware, or a combination of software and hardware.

The desired clock frequencies for each clock may be programmed into the SOC 10 (block 80). For example, in an embodiment, the SOC 10 may include a power manager configured to manage clock and supply voltage changes to various components in the SOC 10. The power manager may include configuration registers that are programmable with the desired frequencies. Frequencies for the MC_Clk, the Fabric_Clk, the CPU_Clk, the P_Clk1, and the P_Clk2 may be programmed. If at least one of the clock frequencies that controls communication for a component on the communication fabric 27 is programmed to a lower clock frequency than the Fabric_Clk (decision block 82, "yes" leg), the delay factor N may be determined to be greater than or equal to a ratio of the Fabric_Clk frequency to the slow clock frequency (block 84). If there is more than one slow clock frequency, the delay factor N may be determined using the lowest frequency (slowest clock). The delay factor N may be programmed for the arbiter 20 (configuration registers 24) along with the deficit weights (if the arbiter 20 is being initialized) (block 86). If there are no slow clocks (decision block 82, "no" leg), the delay may be disabled and the weights may be programmed if initializing (block 88). The delay may be disabled by updating an enable/disable indication (e.g. bit) in the configuration registers 24, for example. Alternatively, the delay may be disabled by writing the delay factor N to zero.

In some embodiments, the arbiters 20 may implement a scheme to improve the bandwidth usage in the communication fabric 27 when temporary blockages prevent the next transaction source in the round robin order from transmitting a transaction. The temporary blockages may occur due to protocol limitations, lack of buffer space in a receiver for the transaction, etc.

Figure 5:
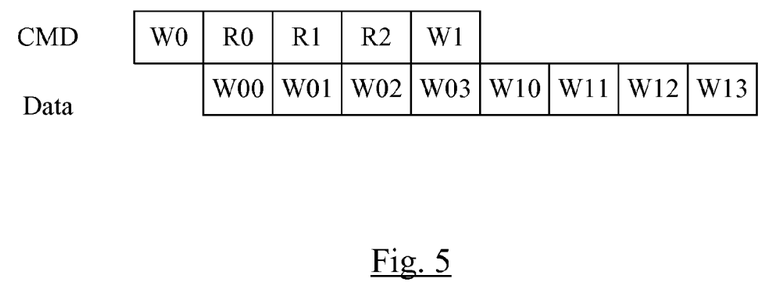
FIG. 5 is a timing diagram illustrating one embodiment of command and data transmissions for transactions.

FIG. 5 is a timing diagram illustrating an example of a temporary blockage due to a protocol limitation. In this example, each link in the communication fabric 27 includes a command portion (CMD) and a data portion (Data) to transmit transaction. The commands may include, e.g., read and write commands for read and write transactions. The data portion may be used to transmit write data. In the illustrated embodiment, write data for different write commands may not be interleaved and is transmitted in order. Accordingly, once a write command has been transmitted (e.g. W0 in FIG. 5), another write command may not be transmitted until the last beat of write data for the preceding write command is ready to be transmitted. In the example, there are 4 beats of write data for W0 (W00, W01, W02, and W03). Accordingly, the next write command (e.g. W1 in FIG. 5) may not be transmitted until the clock cycle that W03 is transmitted on the data portion. In this embodiment, the next write command may be transmitted concurrent with the last data beat of the preceding write. Such an embodiment allows the write data portion of the link to be fully utilized.

On the other hand, read commands may be transmitted during the time that write data is being transmitted (e.g. the read commands R0, R1, and R2 in FIG. 5). The read commands may receive data on a different link than the write data is transmitted, and thus there is no conflict. Accordingly, in the case that the write command W0 is selected and the next transaction source in the round robin order has a read transaction, the read transaction may be transmitted. However, if the next transaction source has a write transaction, the write transaction is temporarily blocked and no command would be transmitted.

Figure 6:
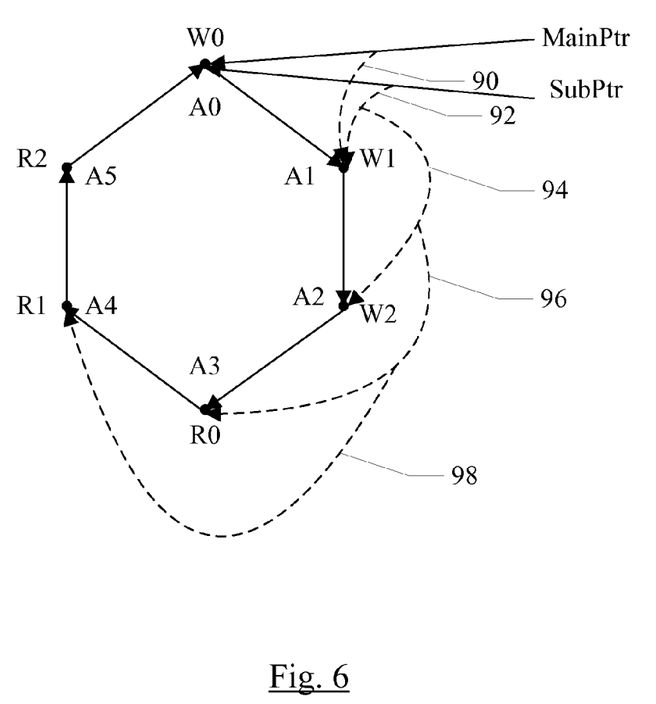
FIG. 6 is an example of operation of one embodiment of the one or more arbiters shown in FIG. 1.

FIG. 6 illustrates an exemplary round robin order among six transaction sources (or agents) A0 to A5. The round robin order is represented by the ring of solid arrows between the agents, A0 to A1, A1 to A2, etc., until A5 to A0 again. On the outside of the ring are exemplary transactions that the transaction sources have to transmit. The source A0 has a write transaction W0; A1 has a write transaction W1; A2 has a write transaction W2; A3 has a read transaction R0; A4 has a read transaction R1; and A5 was a read transaction R2.

The arbiter 20 may be configured to maintain a first pointer (MainPtr in FIG. 6) and a second pointer (SubPtr) for round robin arbitration. Initially, the MainPtr and the SubPtr may indicate the same transaction source (e.g. A0 in FIG. 6). The MainPtr may visit the transaction sources in the round robin order, giving each transaction source its opportunity to be the arbitration winner. The SubPtr may be used when the MainPtr is indicating a transaction source that has a write transaction and the transaction is temporarily blocked because a previous write transaction is still in the process of transmitting data. More particularly, the arbiter 20 may be configured to search forward from the SubPtr according to the round robin order to locate a read transaction if the transaction at the agent indicated by the MainPtr is blocked.

With the example transactions illustrated in FIG. 6, the MainPtr indicates A0 and the write transaction W0 wins arbitration and is transmitted. The MainPtr and SubPtr advance to A1 (dotted arrows 90 and 92, respectively). During the next arbitration, the arbiter 20 may detect that the write transaction W1 at A1 is blocked. The SubPtr may search forward, detecting the W2 write transaction at A2 (dotted arrow 94) which is also blocked and continuing forward to A3 (dotted arrow 96). The R0 transaction at A3 wins arbitration and is transmitted, and the SubPtr advances to the next transaction source after A3 in the round robin order (A4, dotted arrow 98). The MainPtr may remain pointed at A1. Subsequent arbitrations may permit R1 and R2 to be transmitted based on the SubPtr. Then, the write transaction W1 becomes unblocked. The MainPtr may select the write transaction W1, and may be advanced to A2. The SubPtr may return to A2 as well in response to the MainPtr being advanced.

While the above example uses blocked write transactions and unblocked read transactions, other embodiments may implement the arbiter 20 similarly for any temporarily blocked transactions and searching forward for unblocked transactions.

Figure 7:
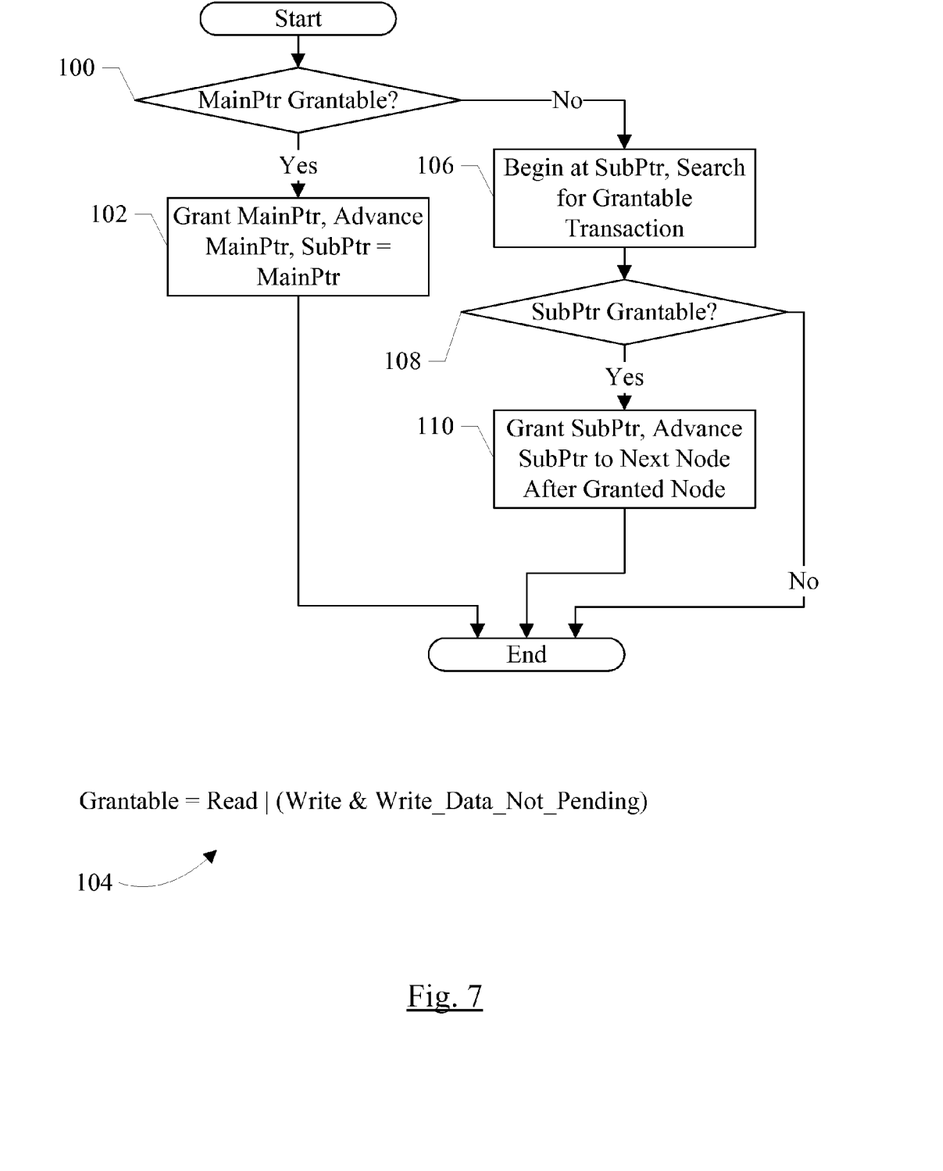
FIG. 7 is a flowchart illustrating operation of one embodiment of one or more arbiters shown in FIG. 1.

FIG. 7 is a flowchart illustrating operation of one embodiment of the arbiter 20 using the MainPtr and SubPtr discussed above. While the blocks are shown in a particular order, other orders may be used. Blocks may be performed in parallel in combinatorial logic within the arbiter 20. Blocks, combinations of blocks, and/or the flowchart as a whole may be pipelined over multiple clock cycles. The arbiter 20 may be configured to implement the operation shown in FIG. 7.

If the transaction at the transaction source indicated by the MainPtr is grantable (decision block 100, "yes" leg), the arbiter 20 may be configured to grant the transaction, advance the MainPtr to the next transaction source in the round robin order, and make the SubPtr equal to the MainPtr (block 102). As illustrated in the formula 104 in FIG. 7, a transaction may be grantable in the sense of FIG. 7 if the transaction is a read, or a write and there is not write data pending for a previous write. In one embodiment, write data is not pending if the last beat of write is to be transmitted this cycle or all of the data has been transmitted. It is noted that there may be other reasons why a transaction is not grantable, which may prevent the transmission of the transaction in the current arbitration round.

If the transaction at the transaction source indicated by the MainPtr is not grantable (decision block 100, "no" leg), the arbiter 20 may be configured to search forward from the SubPtr for a grantable transaction (block 106). If a grantable transaction is located (decision block 108, "yes" leg), the arbiter 20 may be configured to grant the transaction and advance the SubPtr to the next transaction source in the round robin order after the transaction source that is granted (block 110). The MainPtr may remain unmodified Turning next to FIG. 8, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

Figure 8:
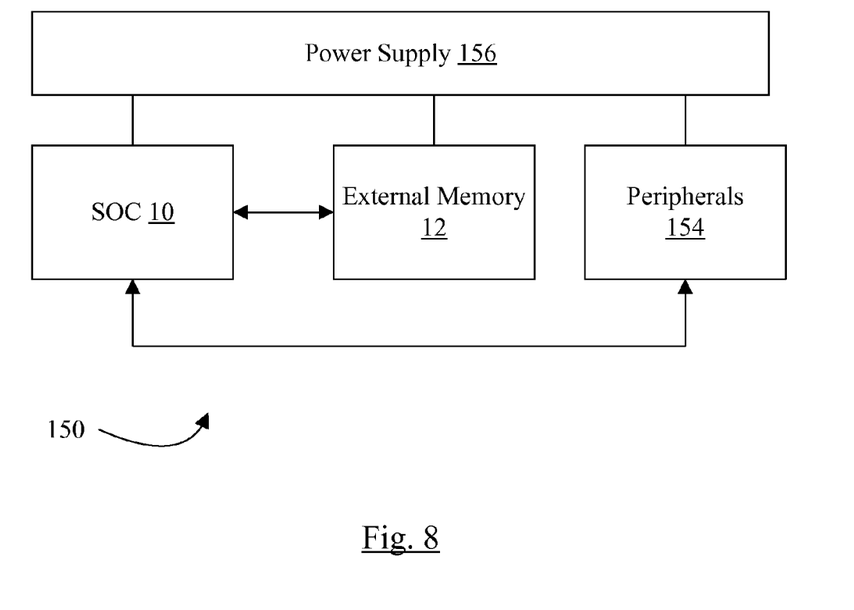
FIG. 8 is a block diagram of one embodiment of a system including the SOC shown in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of transaction sources; and
a fabric interface circuit coupled to the plurality of transaction sources, wherein a first transaction rate corresponding to a first transaction source of the plurality of transaction sources is limited compared to a second transaction rate of at least one other transaction source of a plurality of transaction sources, and wherein the fabric interface circuit includes an arbiter configured to arbitrate among transactions from the plurality of sources using a deficit-weighted arbitration scheme, and wherein the first transaction rate is limited by one or more attributes of the first transaction source independent of the deficit-weighted arbitration scheme, and wherein the arbiter is configured to delay a reload of deficit weights responsive to receiving a lack of a transaction from the first transaction source and the first transaction source has unconsumed weight, wherein the delay is dependent on a ratio of the second transaction rate to the first transaction rate, and wherein the arbiter is configured to reload the deficit weights at an expiration of the delay in response to not receiving a subsequent transaction from the first transaction source during the delay, and wherein the arbiter is configured to reload the deficit weights at the expiration of the delay even in a case that the first transaction source has unconsumed weight at the expiration of the delay.

2. The apparatus as recited in claim 1 wherein an interface between each of the plurality of transaction sources and the fabric interface circuit is operable at a first clock frequency, and wherein at least the first transaction source is operable at a second clock frequency that is lower than the first clock frequency, and wherein the arbiter is configured to delay the reload responsive to the second clock frequency being lower than the first clock frequency.

3. The apparatus as recited in claim 2 wherein the delay is N clock cycles at the first clock frequency, where N is an integer greater than or equal to a ratio of the first clock frequency to the second clock frequency.

4. The apparatus as recited in claim 1 wherein the delay is sufficient for the subsequent transaction to be transmitted to the fabric interface circuit by the first transaction source.

5. The apparatus as recited in claim 1 wherein the arbiter is configured to prevent the reload responsive to receiving the subsequent transaction from the first transaction source during the delay.

6. The apparatus as recited in claim 1 wherein the arbiter is configured to grant a first transaction from one of the plurality of transaction sources and to update a corresponding deficit weight, and wherein the arbiter is configured to reload the deficit weights without delay responsive to each of the deficit weights having been consumed.

7. The apparatus as recited in claim 1 wherein the arbiter is configured to maintain a first pointer according to a round robin order of the plurality of transaction sources, and wherein the arbiter is configured to determine that a given transaction from a given transaction source that is indicated by the first pointer is temporarily blocked, and wherein the arbiter is configured to maintain a second pointer and to search for an unblocked transaction responsive to the second pointer.

8. The apparatus as recited in claim 7 wherein the arbiter is configured to grant the unblocked transaction and to update the second pointer to indicate a third transaction source that is next to a fourth transaction source in the round robin order, wherein the fourth transaction source has the unblocked transaction.

9. The apparatus as recited in claim 8 wherein the arbiter is configured to maintain the first pointer at the given transaction source.

10. The apparatus as recited in claim 9 wherein the arbiter is configured to grant the given transaction responsive to the given transaction becoming unblocked, and wherein the arbiter is configured to advance the first pointer to a fifth transaction source that is next to the given transaction source in the round robin order responsive to granting the given transaction, and wherein the arbiter is configured to update the second pointer to be equal to the first pointer.

11. A method comprising:
detecting, in an arbiter that implements a deficit-weight round robin arbitration scheme, a lack of a transaction from a first transaction source of a plurality of transaction sources, wherein other ones of the plurality of transaction sources have consumed their respective weights in the deficit-weight round robin arbitration scheme;

delaying a reload of the respective weights responsive to the detecting for a predetermined number of clock cycles of a first clock supplied to the arbiter, wherein the predetermined number depends on a ratio of a first clock frequency of the first clock to a second clock frequency of a second clock that is supplied to the first transaction source, wherein delaying the reload permits the first transaction source to present a subsequent transaction in a second clock cycle of the second clock that is consecutive to a first clock cycle in which a preceding transaction was presented by the first transaction source without the reload occurring; and reloading the respective weights responsive to an expiration of the delaying without receiving a subsequent transaction from the first transaction source during the delay, wherein the reloading is performed even in a case that the first transaction source has unconsumed weight.

12. The method as recited in claim 11 further comprising:
detecting a first transaction from the first transaction source during the N clock cycles; and
preventing the reload responsive to detecting the first transaction.

13. The method as recited in claim 11 further comprising:
granting a first transaction from one of the plurality of transaction sources;
updating the respective weight; and
reloading the respective weights without delay responsive to each of the deficit weights having been consumed.

14. The method as recited in claim 11 further comprising:
maintaining a first pointer according to a deficit-weighted round robin order of the plurality of transaction sources;
determining that a given transaction from a given transaction source of the plurality of transaction sources that is indicated by the first pointer is temporarily blocked;
locating an unblocked transaction using a second pointer maintained according to the deficit-weighted round robin order of the plurality of transaction sources;
granting the unblocked transaction; and
updating the second pointer to indicate a second transaction source that is next to a third transaction source in the deficit-weighted round robin order, wherein the third transaction source has the unblocked transaction.

15. The method as recited in claim 14 further comprising:
granting the given transaction responsive to the given transaction becoming unblocked;
advancing the first pointer to a fourth transaction source that is next to the given transaction source in the deficit-weighted round robin order responsive to granting the given transaction; and updating the second pointer to be equal to the first pointer responsive to granting the given transaction.

16. The method as recited in claim 11 further comprising:
determining an integer N responsive to clock frequencies of clocks provided to the plurality of transaction sources and the arbiter, wherein the predetermined number is at least N; and
programming N into a register in the arbiter.

17. An integrated circuit comprising:
a plurality of transaction sources configured to generate memory transactions;
a memory controller configured to couple to a memory; and
a communication fabric coupled between the plurality of transaction sources and the memory controller, wherein the communication fabric includes at least one arbiter configured to arbitrate among at least a subset of the plurality of transaction sources according to a deficit-weighted round robin scheme, and wherein the arbiter is configured to detect that a first transaction source of the subset of the plurality of transaction sources has unconsumed weight and is not transmitting a transaction and that other ones of the subset of the plurality of transaction sources have consumed their respective weights, and wherein the arbiter is configured to delay a reload of the respective weights responsive to the detecting by a predetermined number of clock cycles, wherein the predetermined number of clock cycles depends on a ratio of a first clock frequency at which the communication fabric is operating to a second clock frequency at which the first transaction source is operating, wherein the delay permits the first transaction source to present a subsequent transaction in a second clock cycle of a second clock operating at the second clock frequency, wherein the second clock cycle is consecutive to a first clock cycle of the second clock in which a previous transaction was presented by the first transaction source, and wherein the arbiter is configured to reload the respective weights responsive to an expiration of the delay without receiving a subsequent transaction from the first transaction source during the delay, wherein the arbiter is configured to perform the reload even in a case that the first transaction source has unconsumed weight.

18. The integrated circuit as recited in claim 17 wherein the arbiter is configured to prevent the reload responsive to receiving the subsequent transaction from the first transaction source prior to an end of the N clock cycles.

* * * * *